US009162552B2

(12) United States Patent
Glikis et al.

(10) Patent No.: US 9,162,552 B2
(45) Date of Patent: Oct. 20, 2015

(54) SELF-LOCATING WATER-SOLUBLE GLASS SUPPORT

(71) Applicants: Harry J Glikis, Dearborn, MI (US); Giurgevca Palincas, Chesterfield, MI (US)

(72) Inventors: Harry J Glikis, Dearborn, MI (US); Giurgevca Palincas, Chesterfield, MI (US)

(73) Assignee: FCA US LLC, Auburn Hills, MI (US)

( * ) Notice: Subject to any disclaimer, the term of this patent is extended or adjusted under 35 U.S.C. 154(b) by 8 days.

(21) Appl. No.: 14/197,872

(22) Filed: Mar. 5, 2014

(65) Prior Publication Data
US 2015/0251522 A1 Sep. 10, 2015

(51) Int. Cl.
*B60J 1/02* (2006.01)
*B60J 1/00* (2006.01)

(52) U.S. Cl.
CPC . *B60J 1/005* (2013.01); *B60J 1/006* (2013.01)

(58) Field of Classification Search
CPC ............ B60J 7/1226; B60J 10/02; B60J 1/02; B60J 10/0045; B60J 1/06; B32B 17/10036; B63B 17/02; H01Q 1/1271; E05B 83/01
USPC .............. 296/96.21, 190.1, 201, 84.1, 90, 93, 296/146.1; 114/361; 52/208; 160/370.21
See application file for complete search history.

(56) References Cited

U.S. PATENT DOCUMENTS

| | | | | |
|---|---|---|---|---|
| 3,837,130 A * | 9/1974 | Hildebrandt et al. | ..... | 52/204.597 |
| 4,047,802 A * | 9/1977 | Pieters | .......................... | 359/549 |
| 4,681,794 A * | 7/1987 | Kunert et al. | .................. | 428/188 |
| 4,839,122 A * | 6/1989 | Weaver | .......................... | 264/129 |
| 4,847,977 A * | 7/1989 | Gold | ................................. | 29/446 |
| 4,938,521 A * | 7/1990 | Kunert | ........................ | 296/96.21 |
| 5,069,012 A * | 12/1991 | Riederer | .......................... | 52/208 |
| 5,214,824 A * | 6/1993 | Lesser et al. | .................... | 16/225 |
| 5,308,135 A | 5/1994 | Stedman | | |
| 5,343,662 A * | 9/1994 | Nelson | ............................ | 52/208 |
| 5,538,314 A * | 7/1996 | Young et al. | ............. | 296/146.15 |
| 5,927,040 A * | 7/1999 | Kuwabara | ..................... | 52/716.8 |
| 6,663,158 B1 * | 12/2003 | Showalter | .................. | 296/96.21 |
| 7,182,397 B1 * | 2/2007 | Desai | ............................ | 296/192 |
| 7,918,494 B2 * | 4/2011 | Jang | .............................. | 296/192 |
| 8,905,460 B2 * | 12/2014 | McCarthy et al. | ........ | 296/146.15 |
| 2003/0000162 A1 * | 1/2003 | Gaiser et al. | .................. | 52/204.5 |
| 2009/0229094 A1 * | 9/2009 | Reese | .............................. | 24/530 |
| 2010/0163676 A1 * | 7/2010 | Burgunder et al. | ......... | 244/129.3 |
| 2012/0098716 A1 * | 4/2012 | Dai | ................................ | 343/713 |
| 2013/0205578 A1 * | 8/2013 | Glikis et al. | .................... | 29/559 |
| 2014/0166809 A1 * | 6/2014 | Dazet | ............................ | 244/121 |
| 2015/0076854 A1 * | 3/2015 | Salamon | ...................... | 296/96.2 |

* cited by examiner

*Primary Examiner* — Kiran B Patel
(74) *Attorney, Agent, or Firm* — Ralph E. Smith

(57) ABSTRACT

An installation system, and method, for installing a transparent pane into a frame. The system includes a base member defining an elongate recess for receipt of the transparent pane, and a magnet is embedded within the base member for magnetically securing the base member to the frame, wherein the base member is formed from a water-soluble material.

7 Claims, 4 Drawing Sheets

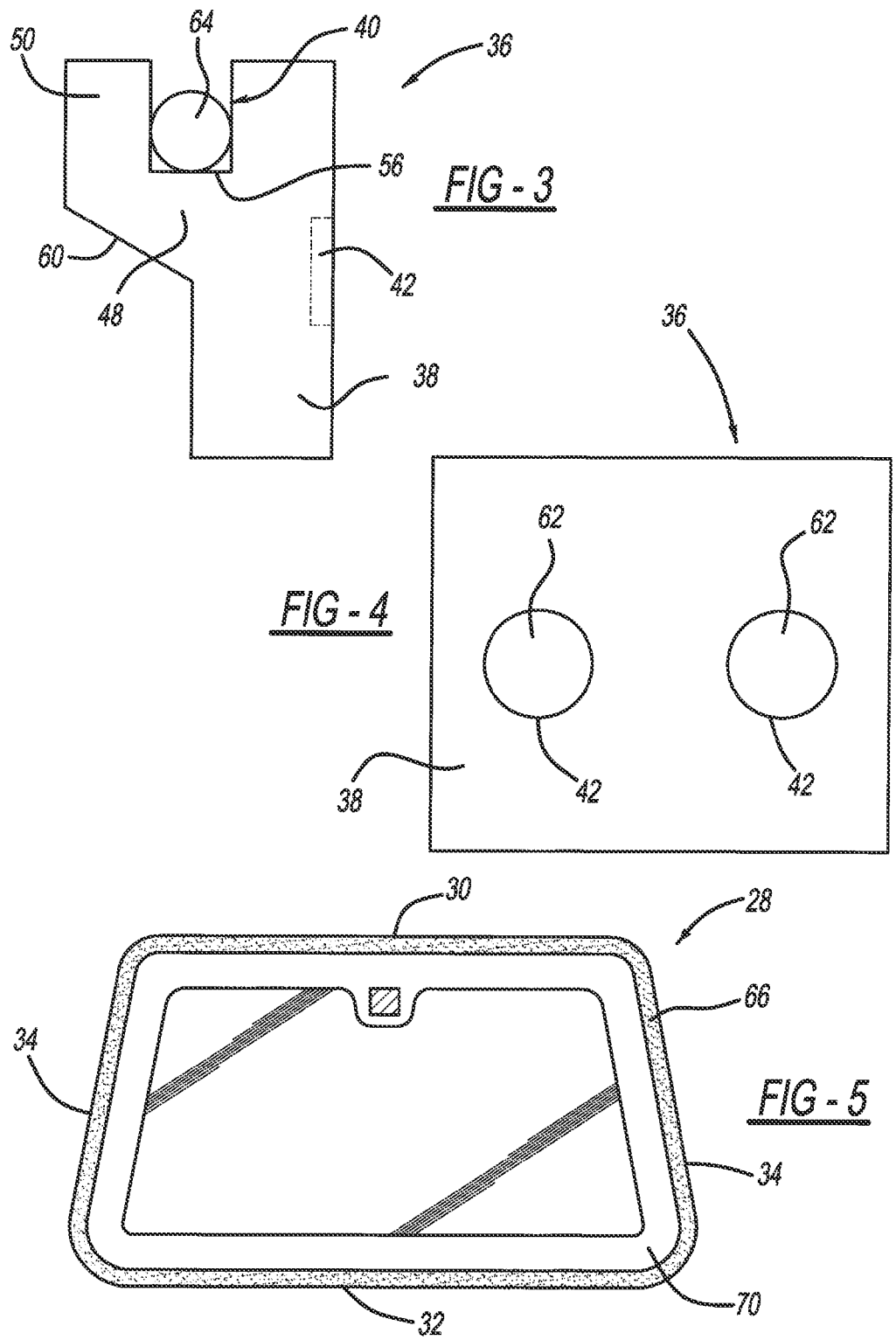

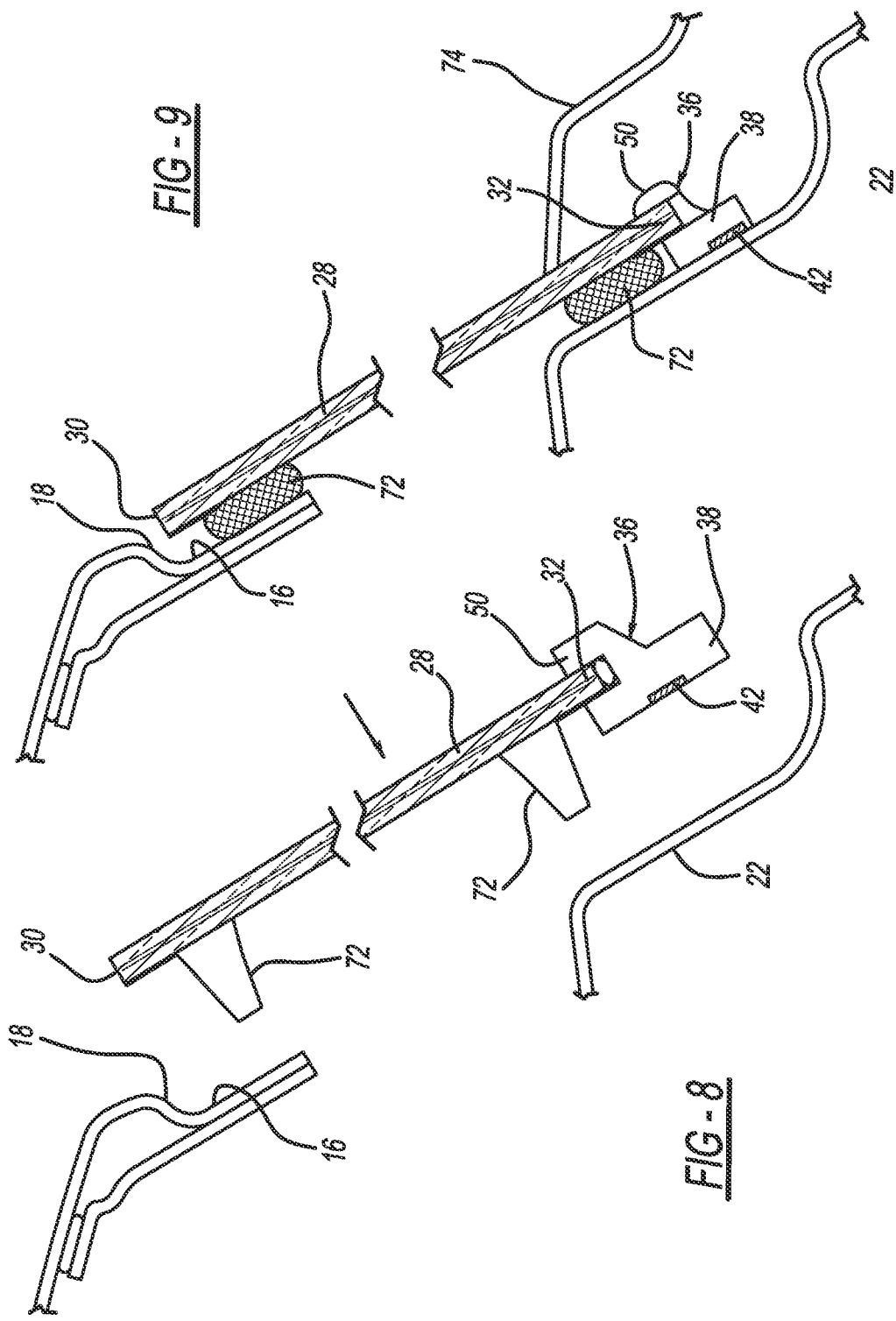

SELF-LOCATING WATER-SOLUBLE GLASS SUPPORT

FIELD

The present disclosure relates to a self-locating water-soluble glass support for installing a windshield, and to a method for installing a windshield using the self-locating water-soluble glass support.

BACKGROUND

Vehicles include glass or other transparent panes of material that are often attached to structures, such as a frame, that supports and attaches to one or more edges of the pane. For example, vehicles may include rear windows, quarter glass, windshields, and the like. The pane can be attached to the frame in many different ways. In some cases, pins or other fasteners are attached to the pane, and the fasteners are attached within corresponding holes formed in the frame. Also, in some cases, the pane can be attached using an adhesive that continuously extends about a periphery of the pane.

When using an adhesive to attach the pane to the frame, permanent glass supports have been used that are fixedly secured to the vehicle cowling or other body components to contact and support the windshield while the adhesive cures. These supports, however, are typically fixed to the vehicle cowling in a manner where the pane is first attached to the frame along a bottom edge thereof. If any manufacturing tolerances are present, a gap can be created between the upper edge of the pane and the frame. If the gap is not covered by a molding piece, the gap can be unsightly. Moreover, as noted above, the supports are permanent. Because the supports are not removed, vibrations from operating the vehicle can be transmitted to the supports. Over time, the supports may generate impact forces that will cause eventual stress cracks.

SUMMARY

The present disclosure provides an installation system for installing a transparent pane into a frame. The system includes a base member defining an elongate recess for receipt of the transparent pane, and a magnet is embedded within the base member for magnetically securing the base member to the frame, wherein the base member is formed from a water-soluble material.

The present disclosure also provides a method of installing a windshield into a windshield frame of a vehicle. The windshield and the windshield frame each include an upper edge, a lower edge, and a pair of side edges between the upper and lower edges. According to the method, at least one support member is coupled to the lower edge of the windshield. The support member includes a base member defining an elongate recess that receives the lower edge therein and a windshield frame abutment surface. The support member also includes a magnet embedded in the base member at the frame abutment surface. The upper edge of the windshield is positioned relative to the upper edge of the windshield frame such that a predetermined orientation between the upper edge of the windshield and the upper edge of the windshield frame is achieved. After orienting the upper edge of windshield and the upper edge of the windshield frame, the lower edge of the windshield including the support member coupled thereto is positioned relative to the lower edge of the windshield frame. The lower edge of the windshield is then secured to the lower edge of the windshield frame with the magnet.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a side perspective view of the support member illustrated in FIG. 2;

FIG. 4 is a rear-perspective view of the support member illustrated in FIG. 2;

FIG. 5 is a perspective view of a windshield including a primer positioned thereon;

FIG. 8 is a partial cross-sectional view of a vehicle windshield frame, with a windshield being installed according to a principle of the present disclosure; and FIG. 9 is a partial cross-sectional view of a vehicle windshield frame, including a windshield installed according to a principle of the present disclosure.

DETAILED DESCRIPTION

Figure 1:
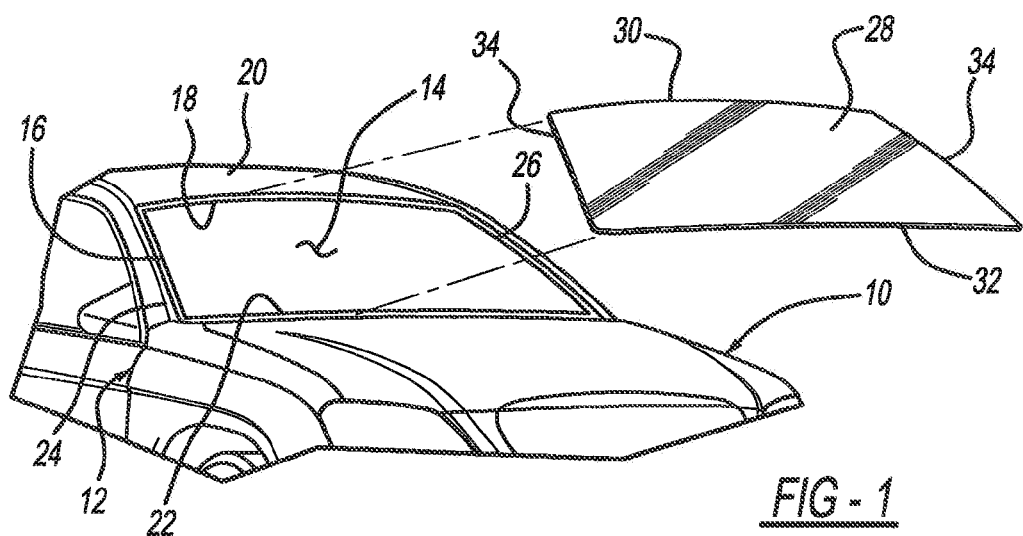
FIG. 1 is a partial perspective view of a vehicle including a windshield being installed.

FIG. 1 illustrates a vehicle 10 including a body 12 with a windshield opening 14. Windshield opening 14 may be defined by a frame 16 including an upper or forward edge 18 of roof section 20, a lower edge or cowling 22, and side edges 24 defined by A-pillars 26. Frame 16 provides a mounting surface for a transparent pane of glass such as a windshield 28. Windshield may include an upper edge 30, a lower edge 32, and side edges 34. Windshield 28 may be formed of any type of material known to one skilled in the art. For example, windshield 28 may be formed of glass, laminated glass, and transparent polymeric materials, without limitation.

Figure 2:
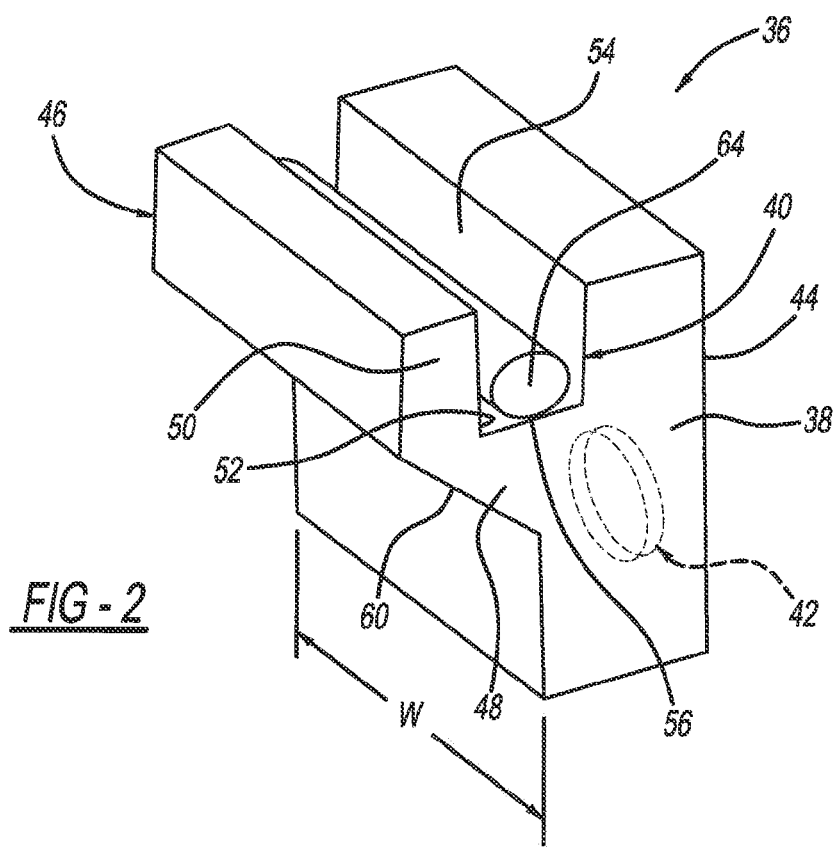
FIG. 2 is a perspective view of a support member used to install a windshield according to a principle of the present disclosure.
Figure 6:
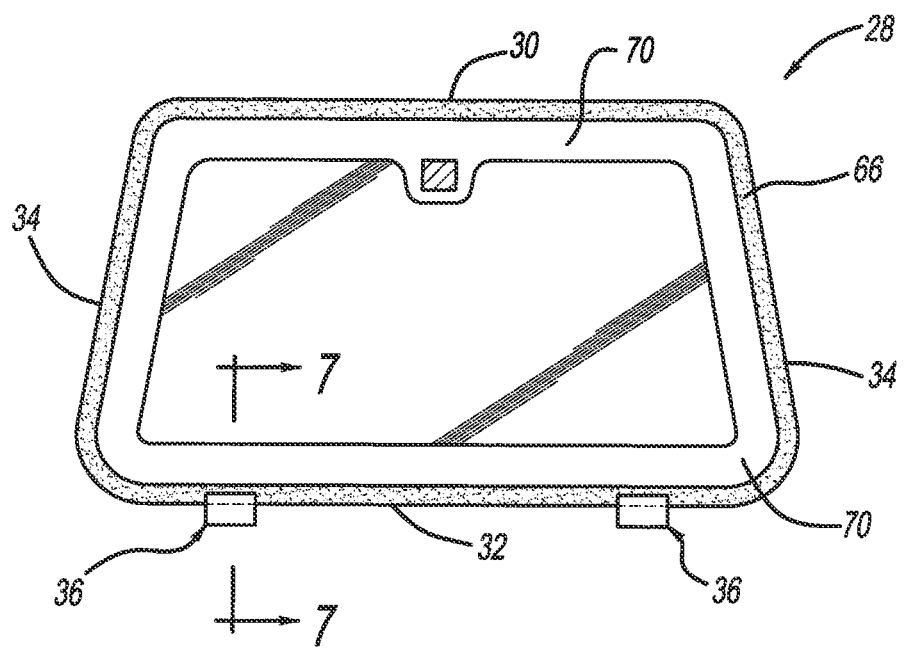
FIG. 6 is a perspective view of the windshield illustrated in FIG. 5, including support members according to the present disclosure positioned thereon.
Figure 7:
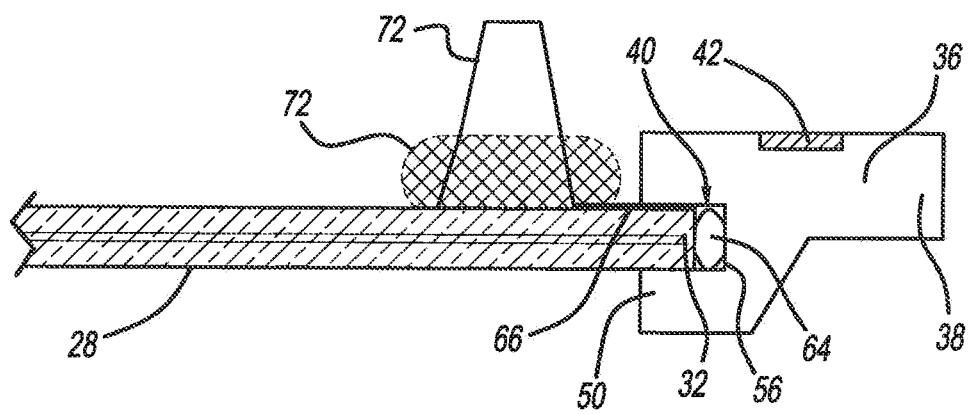
FIG. 7 is a partial cross-sectional view of FIG. 6, including a an adhesive positioned on the primer.

To assist in mounting windshield 28 to frame 16, the present disclosure provides an installation system for installing windshield 28 into frame 16. The installation system includes a support member 36. As best shown in FIGS. 2-4, support member 36 includes a base member 38 defining an elongate recess 40 for receipt of the transparent pane or windshield 28. In addition, support member 36 includes a magnet 42 embedded within base member 38 for magnetically securing base member 38 to frame 16. In addition to including magnet 42, base member 38 is formed from a water-soluble material. Although any water-soluble material can be used that is rigid, yet compressible, preferably base member 38 is formed from a material such as polyvinyl alcohol co-polymer that dissolves over time when exposed to water.

Support member 36 may be a monolithic member where base member 38 defines a frame abutment surface 44 defining a length L and a width W. Length L and width W may be equal, or may be different. Preferably, length L and width W are in the range of 40 to 70 millimeters. An arm 46 extends from base member 38.

Arm 46 may include a first portion 48 that extends substantially perpendicularly from base member 38, and a second portion 50 that extends outward from first portion 48 in a direction substantially parallel with base member 38 such that second portion 50 is spaced apart from base member 38. Second portion 50 includes a pane abutment surface 52 that is positioned opposite to a pane abutment surface 54 of base member 38. A connecting surface 56 extends between pane abutment surfaces 52 and 54. Collectively, pane abutment surfaces 52 and 54 and connecting surface define elongate recess 40 that receives lower edge 32 of windshield 28. It should be understood that although arm 46 is illustrated as including a surface 60 that is acutely angled relative to a line normal base member 38, the present disclosure should not be limited thereto. That is, surface 50 may be perpendicularly oriented relative to base member 38 without departing from the scope of the present disclosure.

Support member 36 may include a plurality of magnets 42 embedded in base member 38 for securing support member 36 and windshield 28 to frame 16. Magnets 42, as illustrated, may be disc-shaped. Magnets 42, however, may be any shape desired, including strip-shaped that extend along an entire or partial length of base member 38. As best shown in FIG. 4, magnets 42 may include an attraction surface 62 that is exposed such that magnets 42 are not entirely embedded within base member 38. In this manner, magnets 42 may more easily be attracted to frame 16 during installation of windshield 28.

Elongate recess 40 may include a first adhesive bead 64 disposed therein. First adhesive bead 64 may be formed from a butyl material. First adhesive bead 64, however, may be formed from other adhesive materials known to those skilled in the art, without limitation. First adhesive bead 64 assists in adhering windshield 28 to support member 36 before windshield 28 is mounted to frame 16.

Now referring to FIGS. 5-9, a method of installing windshield 28 will be described. As shown in FIG. 5, edges 30, 32, and 34 of windshield 28 are coated with a primer 66. Primer 66 assists in cleaning edges 30, 32, and 34 of windshield 28 to provide a clean surface that receives a bead 72 of urethane adhesive that ultimately adheres windshield 28 to frame 16. Primer 66 may be a UV-primer that, when exposed to UV radiation, may fluoresce to allow the applicator of the primer 66 to determine whether primer 66 has been correctly applied to windshield 28. Although windshield 28 is illustrated in FIG. 5 including a ceramic paint 70 along edges 30, 32, and 34, it should be understood that windshield 28 is not required to include this feature.

After application of primer 66 to windshield 28, support members 36 are adhered to lower edge 32. Specifically, first adhesive bead 64 is provided to elongate recess 40 of each support member 36 being used, and then support members 36 are aligned with lower edge 32 of windshield 28 such that lower edge 32 is received within elongate recess 40 as close as possible to connecting surface 56 with first adhesive bead 64 therebetween. It should be understood that if a plurality of support members 36 are being used to mount windshield 28 to frame 16, the support members 36 should be coupled to lower edge 32 in a manner where symmetry of the windshield 28 is achieved. In other words, support members 36 should be coupled to lower edge 32 such that, when windshield 28 is mounted to frame 16, support members 36 each equally support the windshield 28. To assist properly aligning support members 36 relative to lower edge 32, lower edge 32 and support members 36 can each include alignment features (not shown).

After coupling support members 36 to lower edge 32 of windshield 28, a second adhesive bead 72 may be positioned on primer 66 along each of edges 30, 32, and 34 of windshield 28. Second adhesive bead 72 is used to secure windshield 28 to frame 16, as well as seal the interface between windshield 28 and frame 16. Preferably, second adhesive bead 72 is positioned on primer 66 at a location inboard from support members 36. Windshield 28 is now ready to be mounted to frame 16.

To mount windshield 28 to frame 16, firstly, upper edge 30 of windshield 28 is positioned relative to the forward edge 18 of frame 16 such that a predetermined orientation at least between upper edge 30 of windshield 28 and forward edge 18 of frame 16 is achieved. More specifically, upper edge 30 of windshield 28 is contacted with forward edge 18 of frame 16 to compress second adhesive bead 72. Before second adhesive bead 72 dries or cures, upper edge 30 and a portion of side edges 34 are correctly aligned relative to forward edge 18 and side edges 24, respectively, of frame 16. This is particularly important in instances where upper edge 30 of windshield 28 is to remain exposed after installation windshield 28.

More particularly, the upper and side edges 30 and 34 of windshield 28 are typically not exposed (i.e., visible) when windshield 28 is installed. In contrast, the upper and side edges 30 and 34 are typically covered by a rubber or polymeric molding piece (not shown) that extends over the upper and side edges 30 and 34, which can hide alignment imperfections of the windshield 28 relative to frame 16. It may be desirable, however, for vehicle 10 to include styling characteristics where upper and side edges 30 and 34 of windshield 28 are visible. Because upper and side edges 30 and 34 will be visible, it is important that upper and side edges 30 and 34 are correctly aligned relative to forward and side edges 18 and 24 of frame 16 for aesthetic purposes because any alignment imperfection will not be covered by a molding piece.

After properly orienting upper edge 30 of windshield 28 and forward edge 18 of frame 16, lower edge 32 of windshield 28 including support members 36 coupled thereto is positioned relative to cowling 22 of frame 16. Lower edge 32 of windshield is then secured to cowling 22 of frame 16 with magnets 42 of support members 36. Each magnet 42 should be able to withstand at least 4 pounds force (lbf) of shear load to properly support windshield 28 as second adhesive 72 dries or cures so that proper alignment between upper and side edges 30 and 34 of windshield 28 is maintained with forward and side edges 18 and 24 of frame 16, respectively. This shear load is determined based on a windshield 28 weight of thirty-five pounds, a windshield installation angle of 60 degrees, and the free-state shear load being dampened by the second adhesive 72 by seventy-five percent. Of course, if any of the above-noted variables are changed, magnets 42 should be selected that can withstand the appropriate sheet load.

After lower edge 32 of windshield 28 is secured with magnets 42, a cowl screen 74 may be positioned to cover lower edge 32 of windshield 28 and support members 36. Support members 36, therefore, would remain fixed to windshield 28 throughout the life of windshield 28 being mounted to frame 16. To prevent support members 36 from being fixed to windshield 28 throughout the life of windshield 28, support members 36 are formed from a water-soluble material. After second adhesive 72 has dried or cured, therefore, water may be applied to support members 36. The application of water to support members 36 will begin dissolution of support members 36 such that only magnets 42 will remain after the entire dissolution of support members 36. If water is not applied by the installer of windshield 28, exposure to moisture in the atmosphere, rain, and water used during washing of the vehicle 10 will dissolve support members 36. Regardless, support members 36 will be substantially hidden from view by cowl screen 74 until support members 36 fully dissolve.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An installation system for installing a transparent pane into a frame, comprising:
    a base member defining an elongate recess for receipt of the transparent pane; and
    a magnet embedded within the base member for magnetically securing the base member to the frame,
    wherein the base member is formed from a water-soluble material.

2. The installation system of claim 1, further comprising a plurality of magnets embedded within the base member for magnetically securing the base member to the frame.

3. The installation system of claim 1, wherein the water-soluble material is a polyvinyl alcohol co-polymer.

4. The installation system of claim 1, wherein the elongate recess includes a butyl adhesive therein for adhering the transparent pane to the base member.

5. The installation system of claim 1, further comprising a urethane adhesive positioned between the transparent pane and the frame.

6. The installation system of claim 1, wherein the magnet is operable to resist at least 4 pounds force (lbf) shear load.

7. The installation system of claim 1, wherein the transparent pane is a vehicle windshield.

* * * * *